US 6,730,437 B2

(12) United States Patent
Leising et al.

(10) Patent No.: US 6,730,437 B2
(45) Date of Patent: May 4, 2004

(54) ANODE FOR NONAQUEOUS SECONDARY ELECTROCHEMICAL CELLS

(75) Inventors: Randolph A. Leising, Williamsville, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 49 days.

(21) Appl. No.: 09/884,849

(22) Filed: Jun. 19, 2001

(65) Prior Publication Data

US 2003/0003362 A1 Jan. 2, 2003

(51) Int. Cl.[7] .............................................. H01M 4/58
(52) U.S. Cl. ............................. 429/231.1; 429/231.8; 429/231.5; 429/218.1; 429/231.2; 429/219; 429/220; 429/217; 429/330; 429/232; 29/623.1
(58) Field of Search ..................... 429/231.1, 231.8, 429/231.5, 218.1, 231.2, 219, 220, 217, 330, 232; 29/623.1

(56) References Cited

U.S. PATENT DOCUMENTS

| 5,180,642 | A | | 1/1993 | Weiss et al. ................. 429/90 |
| 5,284,721 | A | | 2/1994 | Beard .......................... 429/194 |
| 5,298,349 | A | * | 3/1994 | Takeuchi ..................... 429/219 |
| 5,534,365 | A | * | 7/1996 | Gee et al. ...................... 429/62 |
| 5,545,468 | A | | 8/1996 | Koshiba et al. ............. 429/218 |
| 5,576,120 | A | | 11/1996 | Saidi .......................... 429/218 |
| 5,576,121 | A | | 11/1996 | Yamada et al. ............. 429/220 |
| 5,660,951 | A | | 8/1997 | Yoshida ....................... 429/218 |
| 5,759,715 | A | | 6/1998 | Barker et al. ............... 429/197 |
| 2003/0096168 | A1 | * | 5/2003 | Kasamatsu et al. .... 429/231.95 |

OTHER PUBLICATIONS

Lee et al. "All–Solid–State Rocking Chair Lithium Battery on a Flexible Al Substrate" Electrochemical and Solid–State Letters, 2 (9) pp. 425–427, Jun. 21, 1999.*
Lithium–Ion Cells With Aqueous Electrolytes, W. Li and J.R. Dahn, J. Electrochem. Soc., vol. 142, No. 6, Jun. 1995.
'Chimie douce' synthesis and electrochemical properties of amorphous and crystallized $LiNiVO_4$ vs. Li, F. Osini, E. Baudrin, S. Denis, L. Dupont, M. Touboul, D. Guyomard, Y. Piffard, J.M. Tarascon, Solid State Ionics 107 (1998).

* cited by examiner

*Primary Examiner*—Laura Weiner
(74) *Attorney, Agent, or Firm*—Michael F. Scalise (57) ABSTRACT

The negative electrode or anode for a secondary electrochemical cell comprising a mixture of graphite or "hairy carbon" and a lithiated metal oxide, a lithiated mixed metal oxide or a lithiated metal sulfide, and preferably a lithiated metal vanadium oxide, is described. A most preferred formulation is graphite mixed with lithiated silver vanadium oxide or lithiated copper silver vanadium oxide.

50 Claims, 4 Drawing Sheets

ANODE FOR NONAQUEOUS SECONDARY ELECTROCHEMICAL CELLS

BACKGROUND OF THE INVENTION

1. Field of the Invention

The present invention generally relates to the conversion of chemical energy to electrical energy. More particularly, this invention relates to a novel anode material formulation comprising a carbonaceous material and a lithiated mixed metal oxide, a lithiated metal oxide or a lithiated metal sulfide for the negative electrode of a rechargeable, nonaqueous electrochemical cell. In that respect, the use of graphite and a lithiated metal vanadium oxide as an anode material mixture in conjunction with a cathode active material in a lithium ion electrochemical cell has several advantages. These include increased anode density resulting in higher capacity for the intercalation of lithium, lower initial irreversible capacity, excellent reversibility of lithium doping and undoping, improved cell end of discharge cycle indication, and the prevention of negative electrode copper current collector corrosion prior to initial charging of the cell in comparison to that known by the prior art.

2. Prior Art

The use of lithiated nickel vanadate as an anode material is described by Orsin et al. in *Solid State Ionics* 1998, 107, 123–133. This lithiated metal vanadium oxide material displays very high initial capacity, but suffers from poor capacity retention upon cycling. In U.S. Pat. No. 5,284,721 to Beard, the use of lithiated metal oxides, where the metal is selected from scandium, titanium, yttrium and zirconium, as an anode material, is described. U.S. Pat. No. 5,545,468 to Koshiba et al. claims the use of $LiTi_2O_4$ as an anode for a rechargeable lithium ion cell. Lithiated manganese oxides and vanadium oxides were studied as anode materials by Dahn et al. in *J. Electrochem. Soc.* 1995, 142, 1742–1746. These materials were used for secondary batteries incorporating aqueous electrolytes. The use of a mixture of graphite and copper oxide or lithiated copper oxide as an anode for lithium ion batteries is also described in U.S. Pat. No. 5,576,121 to Yamada et al. However, copper oxides do not provide as high of capacity as the metal vanadium oxide materials. Nonaqueous lithium primary batteries using metal vanadium oxide additives in the cathode for end of service indication are described in U.S. Pat. No. 5,180,642 to Weiss et al.

SUMMARY OF INVENTION

The object of this invention is to improve the performance of lithium ion secondary cells. Accordingly, the negative electrode or anode comprises a mixture of graphite or "hairy carbon" and a lithiated metal oxide, a lithiated mixed metal oxide or a lithiated metal sulfide, and preferably a lithiated metal vanadium oxide. A most preferred formulation is graphite mixed with lithiated silver vanadium oxide or lithiated copper silver vanadium oxide. This anode active mixture produces advantages in lithium ion secondary cells not known in the prior art including the prevention of corrosion of the copper current collector prior to initial cell charging, improved cell end of service indication, high capacity for the intercalation of lithium, low initial irreversible capacity, and excellent reversibility of lithium doping and undoping in the anode electrode.

These and other objects of the present invention will become increasingly more apparent to those skilled in the art by reference to the following description and to the appended drawings.

DETAILED DESCRIPTION OF THE PREFERRED EMBODIMENTS

The term "transition metal" as used herein means an element having greater than 8 and less than 18 electrons in the outer group of the ion. Transition metals are thus usually capable of electron transitions between their outer shells and the resulting variable valency states render them capable of inducing oxidation reactions. Typical transition metals whose salts and complexes could be considered for use in carrying out the present invention are Ce, Zn, Cu, Ag, Ni Co, Fe, Mn, Cr, and V.

An electrochemical cell according to the present invention is of a secondary, rechargeable chemistry and comprises an anode active material selected from Groups IA, IIA and IIIB of the Periodic Table of the Elements, including lithium, sodium, potassium, etc., and their alloys and intermetallic compounds, for example, Li—Si, Li—Al, Li—B and Li—Si—B. The preferred metal comprises lithium.

In secondary electrochemical systems of the present invention, the anode or negative electrode comprises a mixture of at least a first and a second anode materials capable of intercalating and de-intercalating the anode active material, such as the preferred alkali metal lithium. The first anode material is a carbonaceous material comprising any of the various forms of carbon (e.g., coke, graphite, acetylene black, carbon black, glassy carbon, etc.) which are capable of reversibly retaining the lithium species. A "hairy carbon" material is particularly preferred as the carbonaceous material due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

The carbonaceous anode material is mixed with at least a second anode material of a lithiated transition metal constituent which may be a lithiated metal oxide or a lithiated mixed metal oxide comprising at least a first and a second metals or their oxides and possibly a third metal or metal oxide, or a mixture of a first and a second metals or their metal oxides incorporated in the matrix of a host metal oxide. The second anode material may also comprise a lithiated metal sulfide.

The metal oxide or the mixed metal oxide can be produced by the chemical addition, reaction, or otherwise intimate contact of various metal oxides and/or metal elements, preferably during thermal treatment or chemical vapor deposition in mixed states. The active materials thereby produced contain metals, oxides and sulfides of Groups IB, IIB, IIIB, IVB, VB, VIB, VIIB, and VIII of the Periodic Table of Elements, which includes the noble metals and/or other oxide compounds.

By way of illustration, and in no way intended to be limiting, an exemplary anode material comprises silver vanadium oxide (SVO) having the general formula $Li_xAg_yV_2O_z$ in any one of its many phases, i.e. β-phase silver vanadium oxide having in the general formula y=0.35 and z=5.18, γ-phase silver vanadium oxide having in the general formula y=0.80 and z=5.4 and ε-phase silver vanadium oxide having in the general formula y=1.0 and z=5.5, and combination and mixtures of phases thereof. For a more detailed description of silver vanadium oxide materials, reference is made to U.S. Pat. No. 4,310,609 to Liang et al., U.S. Pat. No. 5,389,472 to Takeuchi et al., U.S. Pat. No. 5,498,494 to Takeuchi et al. and U.S. Pat. No. 5,695,892 to Leising et al., all of which are assigned to the assignee of the present invention and incorporated herein by reference.

Another preferred transition metal oxide useful with the present invention is a composite active material that includes $V_2O_z$ wherein $z \leq 5$ combined with $Ag_2O$ with silver being in either the silver(II), silver(I) or silver(0) oxidation state and CuO with copper being in either the copper(II), copper (I) or copper(0) oxidation state to provide the mixed metal oxide having the general formula $Li_xCu_wAg_yV_2O_z$, (CSVO). Thus, this composite active material may be described as a metal oxide-metal oxide-metal oxide, a metal-metal oxide-metal oxide, or a metal-metal-metal oxide and the range of material compositions found for $Li_xCu_wAg_yV_2O_z$ is preferably about $0.01 \leq w \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode active material is prepared in an oxidizing atmosphere such as air or oxygen, or in an inert atmosphere such as argon, nitrogen and helium. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

The thusly produced transition metal active materials are then lithiated by subjecting a formulation of a lithium compound mixed with either SVO or CSVO, or a mixture of them, to thermal treatment at a temperature sufficient to provide a product comprising $Li_xAg_yV_2O_z$ with $0.35 \leq y \leq 1.0$ and $5.18 \leq z \leq 5.5$ or $Li_xCu_wAg_yV_2O_z$ as described above. Suitable heating temperatures range from about ambient to about 600° C. in an inert atmosphere of argon, nitrogen or helium for a time of about 3 to 24 hours. The lithium compound and the mixed metal oxide are preferably mixed in an atomic ratio between Li and SVO or CSVO of about 0.8:1 to about 1:1.

A preferred chemical lithiation of SVO and CSVO comprises adding a sample of the active material to hexane to form a slurry, i.e., 2.5 grams of SVO or CSVO is added to about 25 ml. of hexane. A sample of 1.6M n-butyl lithium in hexane, i.e., about 25 ml., is added to the slurry under an inert atmosphere and reacted at room temperature for about 16 hours. The reaction product is gravity filtered, washed with fresh hexane, and dried under vacuum at room temperature.

In addition to n-butyl lithium, sec- and tert-butyl lithium are useful lithiation compounds. However, in a broader sense, compounds suitable for forming a lithiated mixed metal oxide according to the present invention include compounds of the formula RLi where R=benzyl, allyl, phenyl, vinyl and methyl. In addition to hexane, cyclohexane and pentane are suitable solvents.

Other lithiated active materials useful with the present invention include lithiated manganese dioxide, lithiated cobalt oxide, lithiated nickel oxide, lithiated copper oxide, lithiated copper sulfide, lithiated iron sulfide, lithiated iron disulfide, lithiated titanium disulfide, lithiated copper vanadium oxide, and mixtures thereof.

A typical negative electrode for a secondary cell of the present invention is fabricated by mixing about 90 to 97 weight percent of the mixture of the first and second anode materials, preferably comprising graphite or "hairy carbon" mixed with lithiated SVO or lithiated CSVO, with about 3 to 10 weight percent of a binder material. The binder material is preferably a fluoro-resin powder such as polytetrafluoroethylene (PTFE), polyvinylidene fluoride (PVDF), polyethylenetetrafluoroethylene (ETFE), polyamides, polyimides, and mixtures thereof.

This anode material mixture may be formed into a free-standing sheet prior to being contacted with a current collector to form the subject electrode. The manner in which the electrode mixture is prepared into a free-standing sheet is thoroughly described in U.S. Pat. No. 5,435,874 to Takeuchi et al., which is assigned to the assignee of the present invention and incorporated herein by reference. A suitable current collector is of a material such as of a nickel, stainless steel, or copper foil or screen, preferably copper. Other methods of providing the negative electrode include casting, pressing, spreading, rolling or otherwise contacting the anode material mixture to the current collector. Electrodes prepared as described above may be in the form of one or more plates operatively associated with at least one or more plates of a counter electrode, or in the form of a strip wound with a corresponding strip of the counter electrode in a structure similar to a "jellyroll".

In the exemplary cell of the present invention, the negative electrode has an extended tab or lead of the same material as the current collector, i.e., preferably copper, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

The positive electrode for the present secondary electrochemical cells preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The above described active materials for the positive electrode are formed into an electrode body for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The positive electrode further comprises a binder material which is preferably a fluoro-resin powder such as powdered polytetrafluoroethylene (PTFE) or powdered polyvinylidene fluoride (PVDF). Preferably the positive electrode comprises from about 80% to 99%, by weight, of the cathode active material, 1 to 10% of the binder material and 0 to 10% of the conductive diluent.

A preferred embodiment of the present secondary cell comprises a negative electrode of graphite or "hairy carbon" mixed with lithiated SVO in any one of its many phases, or mixtures thereof, and/or lithiated CSVO and a binder material. A preferred formulation for the anode active mixture of the negative electrode ranges from about 50% graphite to about 50% lithiated SVO or lithiated CSVO to about 90% graphite to about 10% lithiated SVO or lithiated CSVO, by weight. A preferred formulation of carbonaceous material to lithiated material is about 85%:15% to about 60%:40%, by weight. The positive electrode preferably comprises lithium cobalt oxide mixed with a binder material and a conductive diluent.

To recharge such secondary cells, the lithium metal comprising the positive electrode is intercalated into the anode material mixture comprising the first carbonaceous active material and the second lithiated anode material by applying an externally generated electrical potential. The applied recharging electrical potential serves to draw lithium ions from the cathode active material, through the electrolyte and into the carbonaceous material and the second lithiated anode material of the negative electrode to saturate the anode active mixture. In the charged state, the resulting $Li_xC_6$ carbonaceous material can have an x ranging from about 0.1 to about 1.0 while the second lithiated anode materials of $Li_xAgV_2O_{5.5}$ or $Li_xCu_{0.5}Ag_{0.5}V_2O_{5.75}$ can have an x ranging from about 4 to about 12. The cell is then provided with an electrical potential and discharged in a normal manner. With the cell in a discharged state having the cathode active material being lithiated, the latter lithiated metal oxides have an x ranging from about 0.5 to about 4.0.

In order to prevent internal short circuit conditions, the positive electrode is separated from the negative electrode by a suitable separator material. The separator is of electrically insulative material, and the separator material also is chemically unreactive with the negative and positive electrode materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.). The separator may also be composed of non-woven glass, glass fiber materials and ceramic materials.

The form of the separator typically is a sheet which is placed between the negative and positive electrodes and in a manner preventing physical contact therebetween. Such is the case when the negative electrode is folded in a serpentine-like structure with a plurality of positive electrode plates disposed between the folds and received in a cell casing or when the electrode combination is rolled or otherwise formed into a cylindrical "jellyroll" configuration.

The secondary electrochemical cell of the present invention further include a nonaqueous, tonically conductive electrolyte. The electrolyte serves as a medium for migration of ions between the negative and the positive electrodes during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent system.

For the present secondary cell, the electrolyte preferably comprises an alkali metal salt dissolved in a mixture of aprotic organic solvents comprising a low viscosity solvent including organic esters, ethers, dialkyl carbonates, and mixtures thereof, and a high permittivity solvent including cyclic carbonates, cyclic esters, cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy, 2-methoxyethane (EME), dimethyl carbonate (DMC), diethyl carbonate (DEC), dipropyl carbonate (DPC), ethylmethyl carbonate (EMC), methylpropyl carbonate (MPC), ethylpropyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

A preferred electrolyte for the present secondary cell comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The preferred electrolyte for the secondary cell comprises a lithium salts selected from the group of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof. Suitable salt concentrations typically range between about 0.8 to 1.5 molar.

The assembly of the secondary cell described herein is preferably in the form of a wound element configuration.

That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction for the secondary cell of the present invention. As is well known to those skilled in the art, the exemplary secondary electrochemical systems of the present invention can also be constructed in case-positive configurations.

The following examples describe the manner and process of electrochemical cells according to the present invention, but they are not to be construed as limiting.

EXAMPLE I
Preparation of Electrodes/Density of Anode Coating

Electrodes were prepared using graphite having an additive of lithiated and non-lithiated copper silver vanadium oxide and lithiated silver vanadium oxide mixed therewith. Electrode fabrication started with the addition of the graphite/metal oxide mixture to PVDF binder dissolved in N,N-dimethylformamide solvent to form a slurry. The slurry was spread onto a copper foil substrate and heated to 110° C. to evaporate the solvent. The dry laminate was then pressed at 4,300 lbs./in$^2$ and cut into electrodes 20 cm in length and 2.5 cm in width, with a thickness of 0.020 cm. A metal tab was welded to the copper foil to make electrical connection to the anode. Table 1 lists the density of the anode materials prepared depending on the amount and type of additive used. The addition of the metal vanadium oxides and lithiated metal vanadium oxides to the graphite material significantly increases the density of the anode material mixtures. This results in an electrode with greater energy density.

TABLE 1

| Density of Compressed Electrodes | | |
|---|---|---|
| Additive | Wt % | Density of Anode Material |
| No Additive | — | 1.24 g/cc |
| $Cu_{0.5}Ag_{0.5}V_2O_{5.75}$ | 25% | 1.40 g/cc |
| $Cu_{0.5}Ag_{0.5}V_2O_{5.75}$ | 50% | 1.56 g/cc |
| $Cu_{0.5}Ag_{0.5}V_2O_{5.75}$ | 75% | 1.78 g/cc |

TABLE 1-continued

| Density of Compressed Electrodes | | |
|---|---|---|
| Additive | Wt % | Density of Anode Material |
| $Li_xCu_{0.5}Ag_{0.5}V_2O_{5.75}$ | 25% | 1.38 g/cc |
| $Li_xAgV_2O_{5.5}$ | 25% | 1.45 g/cc |

EXAMPLE II
Electrochemical Test of Anode Mixtures

The performance of the various mixtures of graphite and lithiated metal vanadium oxides described in Example I as mixed material electrodes for secondary nonaqueous electrochemical cells was tested versus a lithium metal counter electrode in nonaqueous electrolyte. To assemble a test cell, the various mixed material electrodes were placed between two layers of polyethylene separator. In each cell, a counter electrode of excess lithium metal pressed to a nickel current collector was placed against the top piece of separator facing the mixed material electrode. The electrodes were wound together in a "jelly-roll" configuration to form a spirally wound electrode assembly. The cells were then activated with 1M $LiPF_6$ or 1M $LiAsF_6$, in EC/DMC (3:7) electrolyte under vacuum.

The rechargeable test cells were first discharged at a constant current (0.5 mA/cm$^2$) to +0.02 V vs. Li/Li$^+$, and then charged at a constant current (0.5 mA/cm$^2$) up to a voltage of +1.5V vs Li/Li$^+$, for at least 5 cycles. The voltage vs. time profile of the cells was monitored and the delivered capacity calculated. On completion of the test, the cells were disassembled in a fully charged state to evaluate the condition of the fully-lithiated mixed material electrodes and to examine them for the presence of any deposited lithium metal. In each case, the mixed material electrodes were found to be in good condition, with no delamination from the copper foil substrate. No deposited lithium was observed in these tests.

Figure 1:
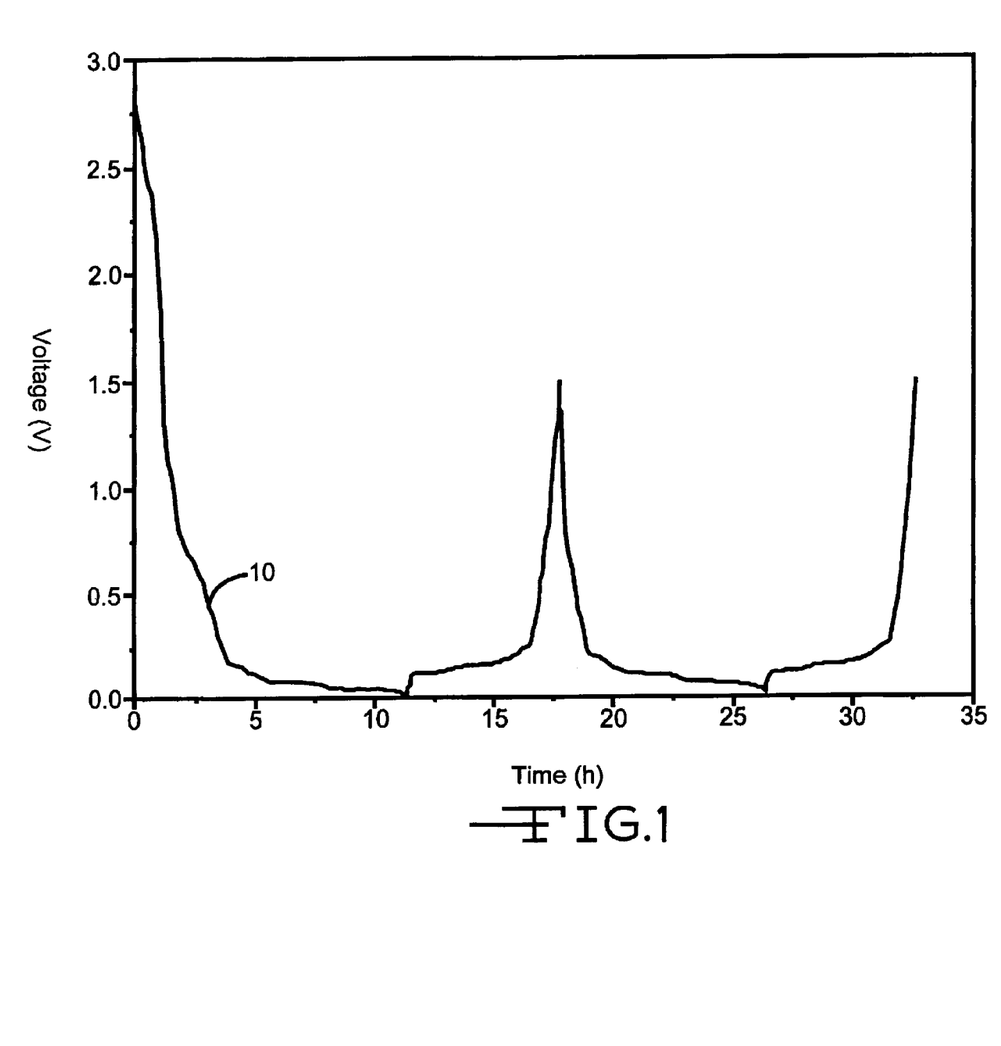
FIG. 1 is a graph of the voltage versus time curve for a 75% graphite/25% $Cu_{0.5}Ag_{0.5}V_2O_{5.75}$ electrode cycled versus lithium metal.
Figure 2:
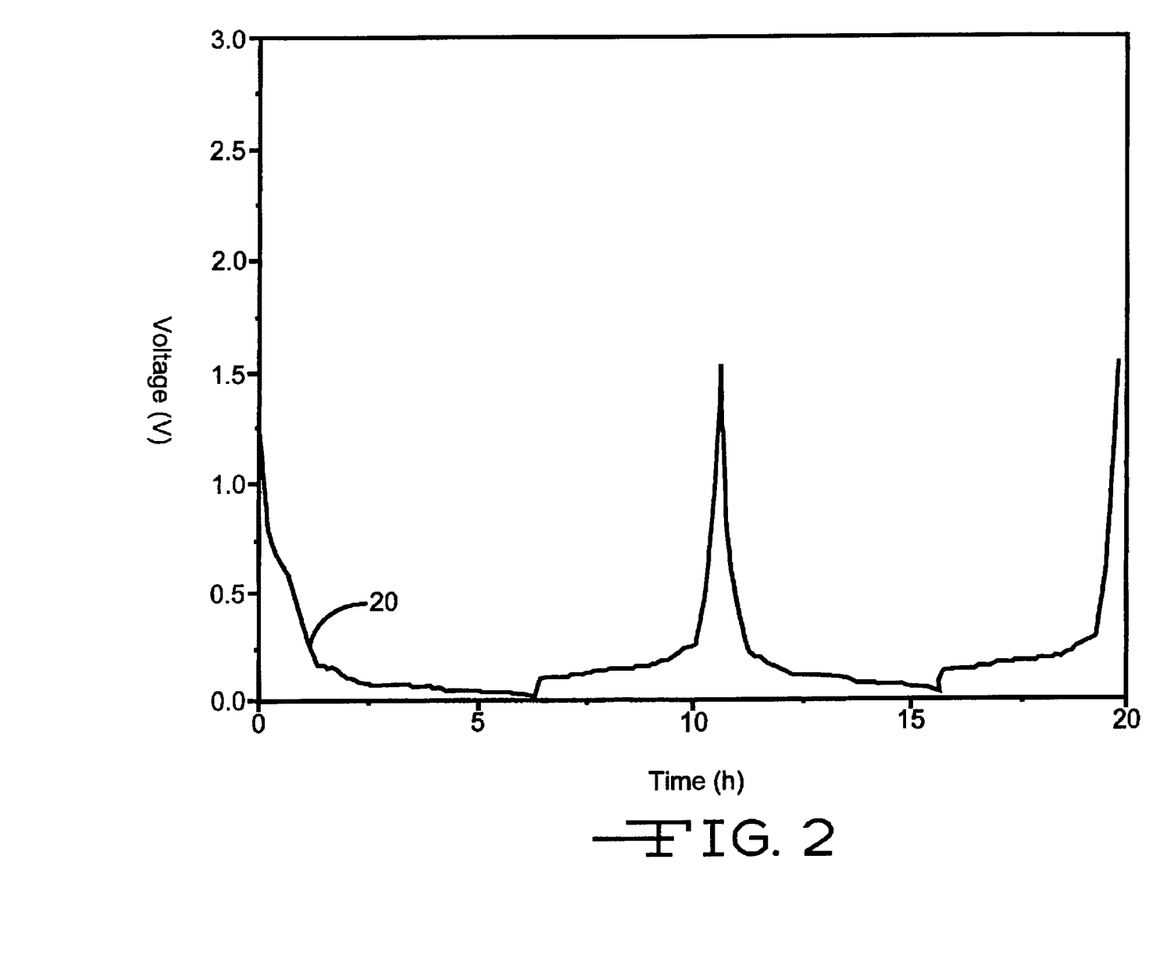
FIG. 2 is a graph of the voltage versus time curve for a 75% graphite/25% $Li_xCu_{0.5}Ag_{0.5}V_2O_{5.75}$ electrode cycled versus lithium metal.

FIG. 1 displays the voltage versus time curve 10 for a 75% graphite/25% $Cu_{0.5}Ag_{0.5}V_2O_{5.75}$ electrode cycled versus a counter electrode of excess lithium metal. The first discharge cycle displays considerable irreversible capacity (capacity which is not returned on subsequent charge and discharge cycles) between 0 and 5 hours. Irreversible capacity in lithium ion cells is undesirable because additional capacity must be provided from the positive electrode, lowering the overall energy density of the system. However, when an electrode utilizing 75% graphite/25% $Li_xCu_{0.5}Ag_{0.5}V_2O_{5.75}$ is tested (FIG. 2, curve 20), the irreversible capacity is substantially reduced. Similar results were obtained for cells utilizing a mixture of 75% graphite/25% $Li_xAgV_2O_{5.5}$. Both cells displayed very little capacity fade over the 10 cycles tested, demonstrating good reversibility for doping and undoping of lithium in these mixed material electrodes. Thus, the use of lithiated metal vanadium oxide as an additive for a graphite negative electrode provides a significant benefit compared to graphite negative electrodes devoid of a lithiated additive.

Increasing the amount of the metal vanadium oxide additive in the graphite negative electrode from 25% or 50% to 75%, by weight, significantly increased the capacity fade during the cycle test. The relatively high fade at 75% $Cu_{0.5}Ag_{0.5}V_2O_{5.75}$ is expected based on results published in the prior art, but the relatively low fade observed at 25% metal vanadium oxide was an unexpected result. These cells displayed relatively low capacity fade while retaining higher overall capacity. Capacity fade is summarized in Table 2.

The lithiated metal vanadium oxide additives also displayed low capacity fade when utilized in weight % amounts of 13% and 25% relative to the graphite in the negative electrode.

TABLE 2

Capacity Fade During Cycle Test of Electrochemical Cells

| Additive | Wt % | Anode Capacity (mAh/g) Cycle 1 | Cycle 3 | % Fade |
|---|---|---|---|---|
| No Additive | — | 312 | 318 | — |
| $Cu_{0.5}Ag_{0.5}V_2O_{5.75}$ | 25% | 372 | 352 | 5% |
| $Cu_{0.5}Ag_{0.5}V_2O_{5.75}$ | 50% | 624 | 517 | 17% |
| $Cu_{0.5}Ag_{0.5}V_2O_{5.75}$ | 75% | 778 | 131 | 83% |

EXAMPLE III
Open Circuit Storage of Electrochemical Cells

Figure 3:
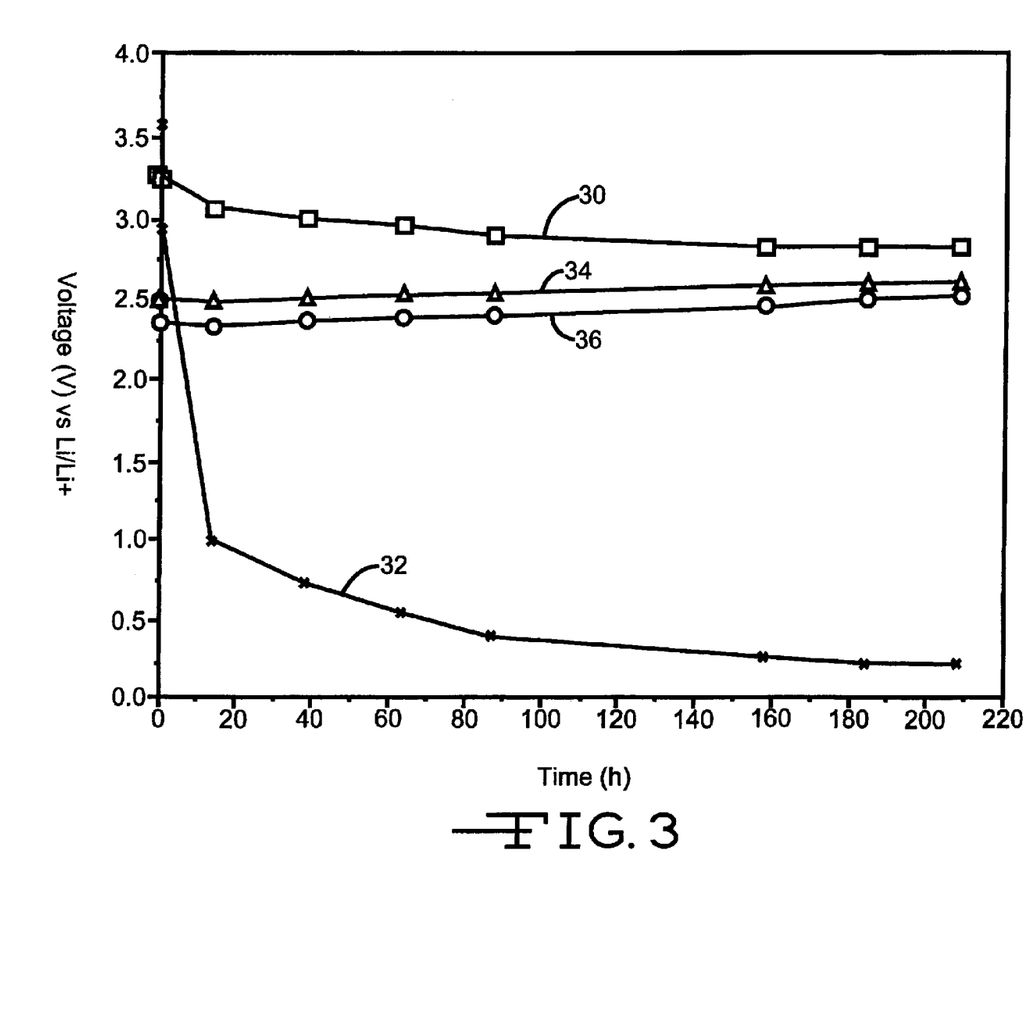
FIG. 3 is a graph of the open circuit voltage of various lithium ion cells according to both the prior art and the present invention as a function of stand time.

Lithium ion electrochemical cells were assembled as described above, activated with 1M $LiAsF_6$ EC/DMC (3:7) electrolyte, and allowed to stand under open circuit condition at room temperature for several days. The plot of open circuit voltage (OCV) as a function of stand time is shown in FIG. 3, wherein curve 30 is of the test cell having graphite only in the electrode opposite the excess lithium, curve 32 is of the test cell having graphite/$Cu_{0.5}Ag_{0.5}V_2O_y$, curve 34 is of the test cell having graphite/$Li_xAgV_2O_y$, and curve 36 is of the test cell having graphite/$Li_xCu_{0.5}Ag_{0.5}V_2O_y$. Electrochemical cells containing no additive (curve 30) and $Cu_{0.5}Ag_{0.5}V_2O_{5.75}$ additive (curve 32) displayed a significant decrease in OCV over time, while cells with $Li_xAgV_2O_{5.5}$ (curve 34) or $Li_xCu_{0.5}Ag_{0.5}V_2O5.75$ (curve 36) displayed an increase in OCV over several days. After about 9 days, the cells were disassembled and the lithium metal counter electrodes examined. The lithium counter electrodes from cells containing $Cu_{0.5}Ag_{0.5}V_2O_{5.75}$ as an additive or pure graphite were discolored. In comparison, the surface of the lithium counter electrodes from the cells containing lithiated metal vanadium oxide additives were clean, with no sign of contamination.

The lithium metal counter electrodes from each of the cells were analyzed by Energy Dispersive X-ray Spectroscopy (EDS). The results of this study are given in Table 3. The presence of copper contamination on the lithium metal counter electrode was confirmed by the EDS experiment. Copper contamination results from corrosion of the copper foil substrate on the graphite electrode when the electrode voltage is above about 3 V vs. $Li/Li^+$. Graphite electrodes typically display an initial OCV of about +3.2 to +3.3 V vs. $Li/Li^+$, indicating that corrosion of the copper foil substrate occurs in lithium ion cells prior to initial cell charging. The presence of copper contamination reduces the cycle life of these cells. Thus, the addition of a lithiated metal vanadium oxide additive provides the benefit of eliminating current collector corrosion and subsequent contamination.

TABLE 3

Analysis of Lithium Electrode from OCV Storage

| Additive | Wt % | EDS Analysis |
|---|---|---|
| No Additive | — | Copper Detected |
| $Cu_{0.5}Ag_{0.5}V_2O_{5.75}$ | 25% | Copper Detected |

TABLE 3-continued

Analysis of Lithium Electrode from OCV Storage

| Additive | Wt % | EDS Analysis |
|---|---|---|
| $Li_xCu_{0.5}Ag_{0.5}V_2O_{5.75}$ | 13% | No Copper Detected |
| $Li_xAgV_2O_{575}$ | 13% | No Copper Detected |

EXAMPLE IV
End of Service Indication in Lithium Ion Cells

Figure 4:
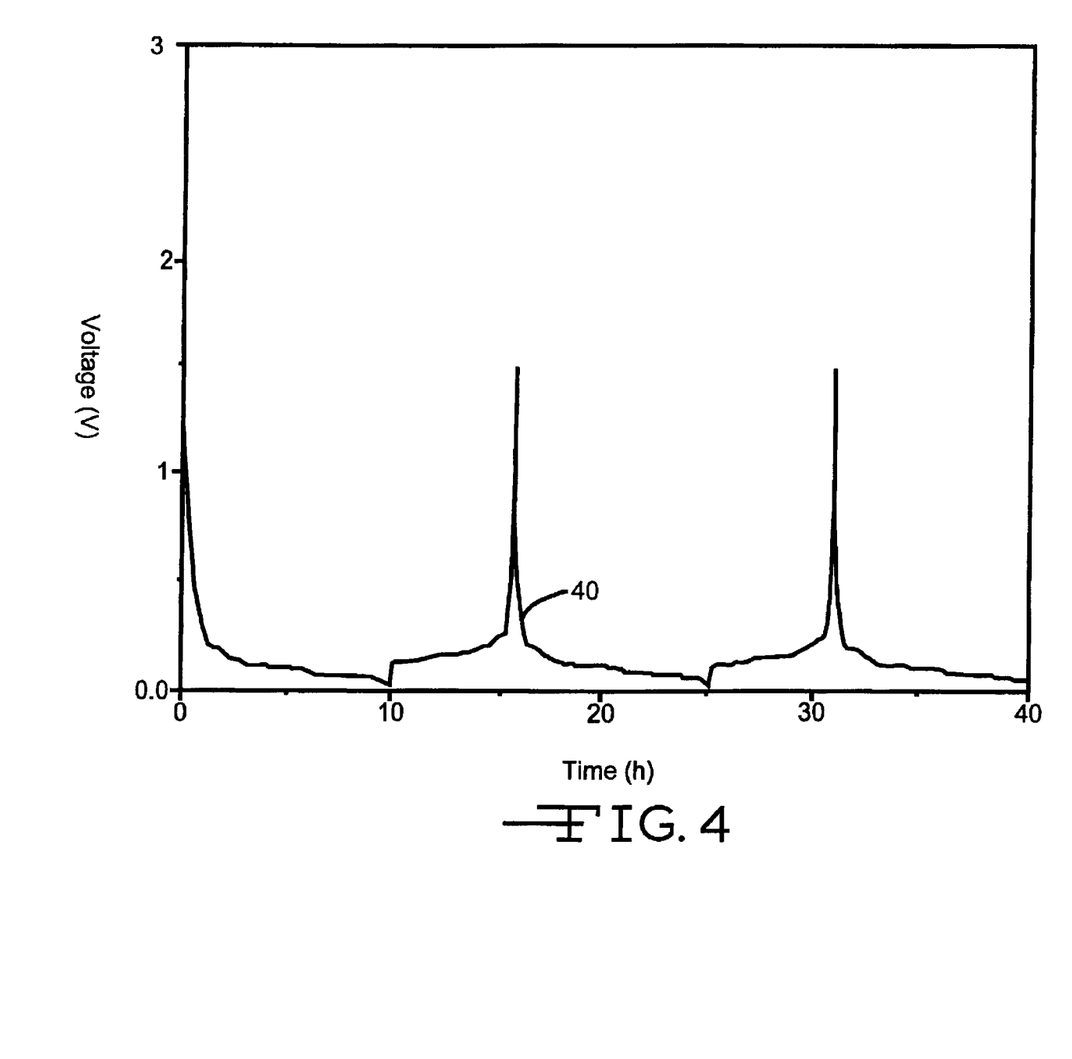
FIG. 4 is a graph of the voltage versus time curve for a lithium ion cell having graphite as the anode material for the negative electrode.

It is known that lithium ion cells utilizing graphite negative electrodes provide little end of service (EOS) indication on the discharge step due to the relatively flat charge/discharge curve for graphite. An illustration of this point is given in FIG. 4, which displays the voltage vs. time curve 40 for a graphite electrode with no additive cycled versus a lithium metal counter electrode. At the end of the delithiation of the graphite electrode (corresponding to the discharge of a lithium ion cell), a sharp rise in voltage is observed (at about 15 to 16 hours).

In comparison, the delithiation of graphite electrodes containing 25% $Cu_{0.5}Ag_{0.5}V_2O_{5.75}$ or 25% $Li_xCu_{0.5}Ag_{0.5}V_2O_{5.75}$ display a slower ramp to end of service (see FIG. 1 at about 18 hours for the former material). The practical application of this is that lithium ion cells containing graphite/additive mixed material negative electrodes according to the present invention display improved EOS indication. This property is important in the end use of lithium ion electrochemical cells, where EOS indication is needed in prevention of over-discharge of the cell. Over-discharge of lithium ion cells is detrimental to their performance because it results in high voltages at the negative electrode. This, in turn, produces corrosion of the negative electrode copper current collector.

It is appreciated that various modifications to the present inventive concepts described herein may be apparent to those of ordinary skill in the art without departing from the spirit and scope of the present invention as defined by the herein appended claims.

What is claimed is:

1. An electrochemical cell comprising a negative electrode, a positive electrode comprising a non-lithium-containing cathode active material contacted to a cathode current collector, and an electrolyte, the improvement in the cell comprising:

the negative electrode comprising an anode material mixture of a carbonaceous material and at least a second anode material selected from the group of a lithiated transition metal vanadium oxide, a lithiated transition metal sulfide, and mixtures thereof, contacted to an anode current collector.

2. The electrochemical cell of claim 1 wherein the second anode material is selected from the group of a lithiated silver vanadium oxide, a lithiated copper silver vanadium oxide, a lithiated copper sulfide, a lithiated iron sulfide, a lithiated iron disulfide, a lithiated titanium disulfide, a lithiated copper vanadium oxide, and mixtures thereof.

3. The electrochemical cell of claim 1 wherein the second anode material is lithiated silver vanadium oxide having the general formula $Li_xAg_yV_2O_z$ with $0.5 \leq x \leq 4.0$, $0.35 \leq y \leq 1.0$ and $5.18 \leq z \leq 5.5$.

4. The electrochemical cell of claim 1 wherein the second anode material has the general formula $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$.

5. The electrochemical cell of claim 1 wherein the carbonaceous material is selected from the group consisting of coke, graphite, acetylene black, carbon black, glass carbon, hairy carbon, and mixtures thereof.

6. The electrochemical cell of claim 1 wherein the carbonaceous material and the second anode material are present in a ratio of about 50:50 to about 90:10, by weight.

7. The electrochemical cell of claim 1 wherein the negative electrode comprises from about 80 to about 99 weight percent of the anode material mixture.

8. The electrochemical cell of claim 7 wherein the negative electrode further comprises a binder material.

9. The electrochemical cell of claim 8 wherein the binder material is a fluoro-resin powder.

10. The electrochemical cell of claim 1 wherein the non-lithium-containing cathode active material is selected from the group consisting of oxides, sulfides, selenides, and tellurides of metals selected from the group consisting of vanadium, titanium, chromium, copper, molybdenum, niobium, iron, nickel, cobalt, and manganese.

11. The electrochemical cell of claim 1 wherein the positive electrode further comprises a binder material and a conductive additive.

12. The electrochemical cell of claim 11 wherein the binder material is a fluoro-resin powder.

13. The electrochemical cell of claim 11 wherein the conductive additive is selected from the group consisting of carbon, graphite powder, acetylene black, titanium powder, aluminum powder, nickel powder, stainless steel powder, and mixtures thereof.

14. The electrochemical cell of claim 1 wherein the electrolyte is a non-aqueous electrolyte and there is a lithium salt dissolved therein.

15. The electrochemical cell of claim 14 wherein the non-aqueous electrolyte comprises a first solvent selected from the group consisting diisopropylether, 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate, ethyl propyl carbonate, methyl acetate, tetrahydrofuran, diglyme, triglyme, tetraglyme, and mixtures thereof.

16. The electrochemical cell of claim 14 wherein the non-aqueous electrolyte comprises a second solvent selected from the group consisting of propylene carbonate, ethylene carbonate, butylene carbonate, γ-valerolactone, γ-butyrolactone, N-methyl -pyrrolidinone, dimethyl sulfoxide, acetonitrile, dimethyl formamide, dimethyl acetamide, and mixtures thereof.

17. The electrochemical cell of claim 1 wherein the electrolyte includes a salt selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof.

18. An electrochemical cell comprising a negative electrode, a positive electrode comprising a cathode active material contacted to a cathode current collector, and an electrolyte, the improvement in the cell comprising:
the negative electrode comprising an anode material mixture of a carbonaceous material and at least a second anode material selected from lithiated silver vanadium oxide having the general formula $Li_xAg_yV_2O_z$ with $0.5 \leq x \leq 4.0$, $0.35 \leq y \leq 1.0$ and $5.18 \leq z \leq 5.5$ and lithiated copper silver vanadium oxide having the general formula $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$.

19. The electrochemical cell of claim 18 wherein the lithiated silver vanadium oxide is selected from the group of β-phase silver vanadium oxide having in the general formula y=0.35 and z=5.18, γ-phase silver vanadium oxide having in the general formula y=0.80 and z=5.4, ε-phase silver vanadium oxide having in the general formula y=1.0 and z=5.5, and mixtures of phases thereof.

20. The electrochemical cell of claim 18 wherein the carbonaceous material is selected from the group consisting of coke, graphite, acetylene black, carbon black, glass carbon, hairy carbon, and mixtures thereof.

21. The electrochemical cell of claim 18 wherein the carbonaceous material and the second anode material are present in a range of about 85%: 15% to about 60%: 40%, by weight.

22. A method for providing an electrochemical cell, comprising the steps of:
a) providing a positive electrode comprising a non-lithium-containing cathode active material;
b) mixing a carbonaceous material with a second anode material selected from the group consisting of a lithiated transition metal vanadium oxide, a lithiated transition metal sulfide, and mixtures thereof;
c) providing a negative electrode by contacting the mixed carbonaceous material and the second anode material to an anode current collector; and
d) activating the positive electrode and the negative electrode with an electrolyte.

23. The method of claim 22 including selecting the second anode material from the group of a lithiated silver vanadium oxide, a lithiated copper silver vanadium oxide, a lithiated copper sulfide, a lithiated iron sulfide, a lithiated iron disulfide, a lithiated titanium disulfide, a lithiated copper vanadium oxide, and mixtures thereof.

24. The method of claim 22 including providing the second anode material as a lithiated silver vanadium oxide having the general formula $Li_xAg_yV_2O_z$ with $0.5 \leq x \leq 4.0$, $0.35 \leq y \leq 1.0$ and $5.18 \leq z \leq 5.5$.

25. The method of claim 22 including providing the second anode material having the general formula $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$.

26. The method of claim 22 including selecting the carbonaceous material from the group consisting of coke, graphite, acetylene black, carbon black, glass carbon, hairy carbon, and mixtures thereof.

27. The method of claim 22 including providing the carbonaceous material and the second anode material being present in the mixture in a ratio of about 50:50 to about 90:10, by weight.

28. The method of claim 22 including selecting the non-lithium-containing cathode active material from the group consisting of oxides, sulfides, selenides, and tellurides of metals selected from the group consisting of vanadium, titanium, chromium, copper, molybdenum, niobium, iron, nickel, cobalt, and manganese.

29. The method of claim 22 including providing the electrolyte as a non-aqueous electrolyte having a lithium salt dissolved therein.

30. The method of claim 22 including providing the second anode material by reacting a lithiated compound mixed with at least one of silver vanadium oxide, copper vanadium oxide, and copper silver vanadium oxide.

31. The method of claim 30 wherein the lithiated compound has the formula RLi and selecting R from the group consisting of n-butyl, sec-butyl, tert-butyl, benzyl, allyl, phenyl, vinyl, methyl, and mixtures thereof.

32. The method of claim 30 including reacting the lithiated compound mixed with at least one of silver vanadium oxide, copper vanadium oxide, and copper silver vanadium oxide at a temperature of about ambient to about 600° C.

33. The method of claim 30 including performing the reaction in an inert atmosphere selected from the group consisting of argon, nitrogen, and helium.

34. The method of claim 30 including performing the reaction for about 3 to 24 hours.

35. The method of claim 30 including mixing the lithiated compound and the at least one of silver vanadium oxide, copper vanadium oxide, and copper silver vanadium oxide in an organic solvent.

36. The method of claim 35 wherein the organic solvent is selected from the group consisting of hexane, cyclohexane, pentane, and mixtures thereof.

37. An electrochemical cell comprising a negative electrode, a positive electrode comprising a non-lithium-containing cathode active material contacted to a cathode current collector, and an electrolyte, the improvement in the cell comprising:

the negative electrode comprising an anode material mixture of a carbonaceous material and at least a second anode material selected from the group of a lithiated silver vanadium oxide having the general formula $Li_xAg_yV_2O_z$ with $0.5 \leq x \leq 4.0$, $0.35 \leq y \leq 1.0$ and $5.18 \leq z \leq 5.5$, a lithiated copper silver vanadium oxide having the general formula $Li_xCU_wAg_yV_2O_z$ with $0.5 \leq x \leq 4.0$, $0.01 \leq w \leq 1.0$, $0.01 \leq y \leq 1.0$ and $5.01 \leq z \leq 6.5$, a lithiated copper vanadium oxide, a lithiated transition metal sulfide, and mixtures thereof, contacted to an anode current collector.

38. A method for providing an electrochemical cell, comprising the steps of:
a) providing a positive electrode comprising a non-lithium-containing cathode active material;
b) mixing a carbonaceous material with a second anode material selected from the group consisting of a lithiated silver vanadium oxide having the general formula $Li_xAg_yV_2O_z$ with $0.5 \leq x \leq 4.0$, $0.35 \leq y \leq 1.0$ and $5.18 \leq z \leq 5.5$, a lithiated copper silver vanadium oxide having the general formula $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, a lithiated copper vanadium oxide, a lithiated transition metal sulfide, and mixtures thereof;
c) providing a negative electrode by contacting the mixed carbonaceous material and the second anode material to an anode current collector; and
d) activating the positive electrode and the negative electrode with an electrolyte.

39. A method for providing an electrochemical cell, comprising the steps of:
a) providing a positive electrode comprising a non-lithium-containing cathode active material;
b) providing a carbonaceous material as a first anode material;
c) reacting a lithiated compound with a transition metal vanadium oxide to provide a second anode material;
d) providing a negative electrode by contacting a mixture of the first carbonaceous material and the second anode material to an anode current collector; and
e) activating the positive electrode and the negative electrode with an electrolyte.

40. The method of claim 39 including reacting the lithiated compound with the transition metal vanadium oxide at a temperature of about ambient to about 600° C.

41. The method of claim 39 including mixing the lithiated compound with the transition metal vanadium oxide in an organic solvent.

42. An electrochemical cell comprising a negative electrode, a positive electrode comprising a cathode active material contacted to a cathode current collector, and an electrolyte, the improvement in the cell comprising:

the negative electrode comprising an anode material mixture of a carbonaceous material and at least a second anode material having the general formula $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$ contacted to an anode current collector.

43. An electrochemical cell comprising a negative electrode, a positive electrode comprising a cathode active material selected from the group consisting of oxides, sulfides, selenides, and tellurides of metals selected from the group consisting of vanadium, titanium, chromium, copper, molybdenum, niobium, iron, nickel, cobalt, and manganese contacted to a cathode current collector, and an electrolyte, the improvement in the cell comprising:

the negative electrode comprising an anode material mixture of a carbonaceous material and at least a second anode material selected from the group of a lithiated transition metal vanadium oxide, a lithiated transition metal sulfide, and mixtures thereof, contacted to an anode current collector.

44. An electrochemical cell comprising a negative electrode, a positive electrode comprising a cathode active material mixed with a fluoro-resin powder and a conductive additive arid contacted to a cathode current collector, and an electrolyte, the improvement in the cell comprising:

the negative electrode comprising an anode material mixture of a carbonaceous material and at least a second anode material selected from the group of a lithiated transition metal vanadium oxide, a lithiated transition metal sulfide, and mixtures thereof, contacted to an anode current collector.

45. An electrochemical cell comprising a negative electrode, a positive electrode comprising a cathode active material mixed with a binder material and a conductive additive selected from the group consisting of carbon, graphite powder, acetylene black, titanium powder, aluminum powder, nickel powder, stainless steel powder, and mixtures thereof and contacted to a cathode current collector, and an electrolyte, the improvement in the cell comprising:

the negative electrode comprising an anode material mixture of a carbonaceous material and at least a second anode material selected from the group of a lithiated transition metal vanadium oxide, a lithiated transition metal sulfide, and mixtures thereof, contacted to an anode current collector.

46. A method for providing an electrochemical cell, comprising the steps of:
a) providing a positive electrode;
b) mixing a carbonaceous material with a second anode material having the general formula $Li_xCu_wAg_yV_2O_z$ with $0.5 \leq x \leq 4.0$, $0.01 \leq w \leq 1.0$, $0.01 \leq y \leq 1.0$ and $5.01'z \leq 6.5$;
c) providing a negative electrode by contacting the mixed carbonaceous material and the second anode material to an anode current collector; and
d) activating the positive electrode and the negative electrode with an electrolyte.

47. A method for providing an electrochemical cell, comprising the steps of:

a) providing a positive electrode of a cathode active material selected from the group consisting of oxides, sulfides, selenides, and tellurides of metals selected from the group consisting of vanadium, titanium, chromium, copper, molybdenum, niobium, iron, nickel, cobalt, and manganese;

b) mixing a carbonaceous material with a second anode material selected from the group consisting of a lithiated transition metal vanadium oxide, a lithiated transition metal sulfide, and mixtures thereof;

c) providing a negative electrode by contacting the mixed carbonaceous material and the second anode material to an anode current collector; and d) activating the positive electrode and the negative electrode with an electrolyte.

48. A method for providing an electrochemical cell, comprising the steps of:

a) providing a positive electrode;

b) providing a carbonaceous material as a first anode material;

c) reacting a lithiated compound mixed with at least one of silver vanadium oxide, copper vanadium oxide, and copper silver vanadium oxide in an inert atmosphere to provide a second anode material;

d) mixing the carbonaceous material with the second anode material;

e) providing a negative electrode by contacting the mixed carbonaceous material and the second anode material to an anode current collector; and f) activating the positive electrode and the negative electrode with an electrolyte.

49. A method for providing an electrochemical cell, comprising the steps of:

a) providing a positive electrode;

b) providing a carbonaceous material as a first anode material;

c) reacting a lithiated compound mixed with at least one of silver vanadium oxide, copper vanadium oxide, and copper silver vanadium oxide for about 3 to 24 hours to provide a second anode material;

d) mixing the carbonaceous material with the second anode material;

e) providing a negative electrode by contacting the mixed carbonaceous material and the second anode material to an anode current collector; and f) activating the positive electrode and the negative electrode with an electrolyte.

50. A method for providing an electrochemical cell, comprising the steps of:

a) providing a positive electrode;

b) providing a carbonaceous material as a first anode material;

c) reacting a lithiated compound with a transition metal vanadium oxide at a temperature of about ambient to about 600° C. to provide a second anode material;

d) providing a negative electrode by contacting a mixture of the first carbonaceous material and the second anode material to an anode current collector; and e) activating the positive electrode and the negative electrode with an electrolyte.

* * * * *

UNITED STATES PATENT AND TRADEMARK OFFICE
CERTIFICATE OF CORRECTION

PATENT NO.    : 6,730,437 B2
DATED         : May 4, 2004
INVENTOR(S)   : Randolph A. Leising et al.

It is certified that error appears in the above-identified patent and that said Letters Patent is hereby corrected as shown below:

Column 11,
Line 47, "N-methyl -pyrrolidinone" should read: -- N-methyl-pyrrolidinone --;

Column 14,
Line 31, "arid" should read: -- and --; and
Line 60, "5.01'z" should read: -- 5.01 ≤z --.

Signed and Sealed this

Third Day of August, 2004

JON W. DUDAS
*Acting Director of the United States Patent and Trademark Office*